US 12,250,068 B2

(12) United States Patent
Sánchez García Viedma (10) Patent No.: US 12,250,068 B2
(45) Date of Patent: Mar. 11, 2025

(54) SYSTEM FOR AERIAL INTERFERENCES CANCELLATION AND RF ENCRYPTION AND GEOLOCATION INHIBITION

(71) Applicant: Integrasys LLC, Herndon, VA (US)

(72) Inventor: Álvaro Sánchez García Viedma, Herndon, VA (US)

(73) Assignee: Integrasys LLC, Herndon, VA (US)

( * ) Notice: Subject to any disclaimer, the term of this patent is extended or adjusted under 35 U.S.C. 154(b) by 318 days.

(21) Appl. No.: 18/095,656

(22) Filed: Jan. 11, 2023

(65) Prior Publication Data
US 2023/0299869 A1    Sep. 21, 2023

Related U.S. Application Data

(60) Provisional application No. 63/321,023, filed on Mar. 17, 2022.

(51) Int. Cl.
*H04K 3/00* (2006.01)
*H04J 3/22* (2006.01)

(52) U.S. Cl.
CPC ............... *H04K 3/226* (2013.01); *H04J 3/22* (2013.01)

(58) Field of Classification Search
CPC ....................................................... H04K 3/226
See application file for complete search history.

(56) References Cited

U.S. PATENT DOCUMENTS

| | | | |
|---|---|---|---|
| 8,644,866 B2 | 2/2014 | Wajcer et al. | |
| 2012/0214524 A1* | 8/2012 | Wajcer | H04B 7/0845 455/502 |
| 2013/0202020 A1* | 8/2013 | Diez | H04B 17/0085 455/115.2 |
| 2013/0208655 A1 | 8/2013 | Jiang et al. | |
| 2018/0183472 A1* | 6/2018 | Wen | H04B 7/0417 |
| 2018/0241423 A1* | 8/2018 | Khoshgard | H04B 1/123 |

FOREIGN PATENT DOCUMENTS

EP         2044703 B1    9/2010

* cited by examiner

*Primary Examiner* — Hsinchun Liao
(74) *Attorney, Agent, or Firm* — The Webb Law Firm (57) ABSTRACT

A system to allow the cancellation of terrestrial interferences over aerial networks (Satellite links, and wireless communications) with the support of a canceller module to dynamically decompose wanted and unwanted signals. The invention performs interference cancellation over satellite carriers affected by terrestrial congested spectrum, including the jamming, share of frequencies, or accidental interferences for satellite communications, GPS, Galileo, GNSS or any type of satellite link. The invention provides resiliency to the communication by the regeneration of the desired signal filtering of any unwanted noise received in a terrestrial antenna without the need of any guidance by the modulation. This invention is applicable for any satellite constellation (GEO, MEO, LEO, GPS, MCODE, GNSS, or wireless connectivity, 2G, 3G, 4G, 5G, 6G, Radar, Wifi, WiMax, etc) and any type of satellite antenna (parabolic, mechanically flat panel antenna, steerable flat panel antennas, unidirectional, etc).

18 Claims, 8 Drawing Sheets

SYSTEM FOR AERIAL INTERFERENCES CANCELLATION AND RF ENCRYPTION AND GEOLOCATION INHIBITION

CROSS REFERENCE TO THE RELATED APPLICATION

This application claims priority to U.S. Provisional Patent Application No. 63/321,023 filed Mar. 17, 2022, the disclosure of which is hereby incorporated by reference in its entirety.

BACKGROUND OF THE INVENTION

Field of the Invention

The present invention belongs to the technical field of the communication signals. Specifically, it is disclosed a system to allow the cancellation of aerial interferences over aerial networks (Satellite links, and wireless communications) with the support of a canceller module to decompose wanted and unwanted signals. It is also provided a dynamically separation and reproduction of the wanted signals. It further provides RF encryption and geolocation inhibition.

The present invention provides means for performing interference cancellation over satellite carriers affected by terrestrial congested spectrum, including the jamming, optimization or share of frequencies, or accidental interferences for satellite communications, GPS, MCODE, Galileo, GNSS or any type of satellite link. The invention may be embedded in a device (computer, Antenna Control Unit, satellite modem, cloud, etc.). The present invention provides resiliency to the communication by the regeneration of the desired signal (=wanted signal) filtering any unwanted noise received in a terrestrial antenna without the need of any guidance of a modulation or specifications prior to the real time operation of the standalone embedded device. The present invention is applicable for any satellite constellation (GEO, MEO, LEO, GPS, MCODE, GNSS, etc), or wireless connectivity (GSM, 2G, 3G, 4G, 5G, 6G, Radar, WiFi, WiMax, etc) and any type of satellite antenna (parabolic, mechanically flat panel antenna, steerable flat panel antennas, unidirectional, etc).

Description of Related Art

In the technical state it is known the document of EP2044703B1, which discloses a satellite interference canceling system. The disclosed system cancels the interference between two or more signals received by a satellite receiver. The signals can be two signals experiencing cross polarization interference or signals that experience interference from other satellite signals. Gain and phase are applied to the received signals and then combined with the other signals to result in cancellation by subtraction. This system does not allow to cancel any terrestrial interferences only satellite interference such as cross polarization interferences.

In the technical state, it is possible to mention the United States Patent US20130208655 which describes a method for cancelling interference caused by a terrestrial transmitter at a satellite receiver in a hybrid satellite-terrestrial network. A satellite receiver generates an interference cancellation signal based on a reference terrestrial signal from the terrestrial transmitter and a received over-the-air (OTA) signal. The satellite receiver then cancels the interference caused by the terrestrial transmitter by combining the interference cancellation signal with the received OTA signal. The interference cancellation signal is a modified version of the reference terrestrial signal. This system requires generating a terrestrial signal based on HPA of a terrestrial antenna, while the present invention does not require any generation of any terrestrial signal for cancelation the interferences.

In the technical state, it is also possible to mention the U.S. Pat. No. 8,644,866B2 which describes a method for communication includes receiving a Radio Frequency (RF) channel containing a desired signal conforming to a first air interface and an interfering signal conforming to a second air interface. A first receiver configured for the first air interface and a second receiver configured for the second air interface are synchronized to a common frequency and timing reference. While the first and second receivers are synchronized, the desired signal is decoded from the RF channel using the first receiver to generate a first output, the interfering signal is decoded from the RF channel using the second receiver to generate a second output, and the desired signal is reconstructed while suppressing the interfering signal by jointly processing the first and second outputs. This method requires demodulating the interference signal, which hinders significantly the support for unknown signals as well as the overall process, while the present invention does not require the demodulation of the interference signal enabling a faster cancelation as well as availability to cancel a much wider cases of unknown interference signals.

Therefore, in the technical state it is not known any system that allows the measurement and cancellation of a terrestrial interference in an external hardware or neither embedded in a satellite antenna control unit or satellite modem.

SUMMARY OF THE INVENTION

In order to achieve the objectives previously mentioned, the present invention discloses a system that allows monitoring of aerial (satellite, wireless communications", and similar terrestrial signals) signals, detecting interference sources and canceling the interference.

The claimed system, like the systems described in the prior art, comprises one or more signal capture devices for satellite and terrestrial signals which are connected to the device that operates and has the option to obtain traces representing signal parameters, like a spectrum analyzer in a graphic user interface.

The novelty of the present invention is to allow the measurement of a signal, detection of interference, filtering of the interference and regeneration of the desired/wanted signal. The system is also able to generate an analog known interference over the desired signal to act as "encryption method". Furthermore, the system is also able to generate an isolated known interference to avoid the location of the system.

The communication between antennas, the provided system and the protected receiver employs TCP/IP and HTTP protocols, very popular and well known in the data communications world.

In a first aspect of the invention, a system for Aerial Interferences Cancellation and RF Encryption and Geolocation inhibition is disclosed. The system comprises the Signal Reception module, the Interference Signal Detection and Estimation module, the Interference Canceller module and the Wanted Signal Generation module. The signal reception module is configured to receive an analog wanted signal with interference from an aerial antenna, to generate a digitalized wanted signal with interference and to generate a tuned and digitalized wanted signal with interference. The Interference Signal Detection and Estimation module is configured to receive the tuned digitalized wanted signal with interference, to receive a digital Controller Feedback signal, and also configured to generate an Estimated Errors signal, a Reference signal and a Detected&Estimated Interference signal. The Interference Canceller module is configured to receive the digitalized wanted signal with interference, the Estimated Errors signal, the Reference signal, and also configured to generate a digital wanted signal. The Wanted Signal Generation module is configured to receive the digitalized wanted signal with interference, the digitalized wanted signal, the Detected&Estimated Interference signal, and to convert the digitalized wanted signal into an analog wanted signal.

In an embodiment of the invention, the Interference Signal Detection and Estimation module is configured to receive an analog interference signal from an optional wireless antenna.

In another embodiment of the invention, the signal reception module comprises the Radio Signal Digitalization sub-module and the Hard Tuning sub-module. The Radio Signal Digitalization sub-module digitalizes, by means of a Analog-to-Digital converter, the analog wanted signal with interference to generate the digital wanted signal with interference. The Hard Tuning sub-module is configured to tune the digital wanted signal with interference based on the Controller Feedback signal coming from the Wanted Signal Generation module, and provides the tuned digital wanted signal with interference.

In another embodiment of the invention, the Interference Signal Detection and Estimation module comprises a Precise Tuning sub-module and an Interference Detection and Estimation sub-module. The Precise Tuning sub-module comprises an input for the digitalized wanted signal with interference and an input for the Controller Feedback signal. The Precise Tuning sub-module is configured to provide the Reference signal which is the tuned signal optimized for the interference reception in digital format; the Precise Tuning sub-module also provides the Estimated Errors signal. The Interference Detection and Estimation sub-module is configured to characterize the value of the Reference signal and also to generate the Interference Detection and Estimation signal to be sent to the Controller of the Wanted Signal Generation.

In another embodiment of the invention, where there is an interference signal, the Interference Signal Detection and Estimation module comprises a Radio Digitalization sub-module, a Selector sub-module, a Precise Tuning sub-module and an Interference Detection and Estimation sub-module. The Radio Digitalization sub-module comprises an input for the analog interference signal, and the Radio Digitalization sub-module is configured to digitalize the analog interference signal. The selector is configured to select between the digitalized interference signal coming from the Radio Digitalization sub-module or the digitalized wanted signal with interference based on the Controller Feedback signal. The Precise Tuning sub-module provides the Reference signal which is the tuned signal optimized for the interference reception in digital format, the Precise Tuning sub-module also provides the Estimated Errors signal. The Interference Detection and Estimation sub-module is configured to characterize the value of the Reference signal and also to generate the Interference Detection and Estimation signal to be sent to the Controller of the Wanted Signal Generation.

In another embodiment of the invention, the Interference Canceller module comprises an ANC Interference Canceller sub-module, which in turn comprises inputs for the Reference signal and for the digitalized wanted signal with interference. The ANC Interference Canceller sub-module comprises an adaptive filter, which is configured to compute the Reference signal, with the digitalized wanted signal with interference to obtain the digital wanted signal.

In another embodiment of the invention, the Interference Canceller module comprises a Hard Interference Canceller sub-module, which in turn comprises inputs for the Reference signal, for the digitalized wanted signal with interference and for the Estimated Errors signal. The Hard Interference Canceller sub-module comprises a Reconstruction Error sub-module, which is configured to compute the Reference signal, the digitalized wanted signal with interference and the Estimated Errors signal to obtain the digital wanted signal.

In another embodiment of the invention, the Wanted Signal Generation module comprises a Receptor, a Controller comprising signal and modulation parameters, a Switcher and the Signal Generator. The Wanted Signal Generation module comprises inputs for the digital wanted signal, which is sent to the Receptor and the Switcher, for the Interference Detection and Estimation signal and for the digitalized wanted signal with interference. The receptor is configured to analyze the digital wanted signal and to provide a Figure of Merit "FoM" information based on time and phase to the Controller. The Controller is configured to provide the Controller Feedback signal and guides the Switcher to select between the digital wanted signal or the digital wanted signal with interference by comparing the Figure of Merit "FoM" of both of them. The Switcher is configured to provide the selected output. The Signal Generator is configured to convert the selected digital signal into an analog signal.

In another embodiment of the invention, the system further comprises an encryption module configured to encrypt the digital wanted signal, wherein the encryption module comprises a jammer signal parameters sub-module, a Limit Controller sub-module and a Signal Generation sub-module. The jammer signal parameters sub-module is configured to set jammer signal parameters by default. The Limit Controller sub-module compares the signal and modulation parameters with the jammer signal parameters, which are adjusted in case the jammer signal parameters exceeds the signal and modulation parameters after being coded. The Limit Controller sub-module is configured to generate a digital interference signal based on the jammer signal parameters and to add the digital interference signal with the digital wanted signal. The signal generator is configured to convert the digital wanted signal with interference into an analog wanted signal with interference and to output it to a jammer antenna.

In another embodiment of the invention, the system further comprises an encryption and inhibitor locator module, which in turn comprises an input for an Encryption On/Off signal and an output for an analog interference signal, wherein the encryption and inhibitor locator module further comprises a jammer signal parameters sub-module, a Limit Controller sub-module and a Signal Generation sub-module. The jammer signal parameters sub-module is configured to set jammer signal parameters by default. The Limit Controller sub-module is configured to generate a digital interference signal based on the jammer signal parameters. The signal generator is configured to convert the digital interference signal into an analog interference signal and to output it to an encryption and inhibitor locator antenna.

In another embodiment of the invention, the system further comprises the jammer antenna connected to the encryption module, and the encryption and inhibitor locator antenna connected to the encryption and inhibitor locator module, wherein the jammer antenna and the encryption and inhibitor locator antenna are placed separately.

In another embodiment of the invention, the system is virtually deployed in a cloud and wherein it further comprises the aerial antenna configured to receive the analog wanted signal with interference; and the optional wireless antenna configured to receive an analog interference signal and transfer this information in digital format to the cloud.

In another embodiment of the invention, the analog interference signal is selected between the group consisting of 5G over C band, L, C, S, X, Ku, Ka, Q, V, terrestrial links and satellite links.

In another embodiment of the invention, the analog interference signal is transmitted over terrestrial networks such as jamming or accidental interferences between terrestrial links and terrestrial links.

In another embodiment of the invention, the analog interference signal is transmitted over terrestrial networks such as jamming or accidental interferences between satellite links and satellite links.

In another embodiment of the invention, the system is embedded in an external device, a firmware or a software.

In another embodiment of the invention, the system is able to cancel interferences over any satellite orbits, GEO, MEO, LEO, GPS, MCODE, GNSS, and wireless communications.

One implementation of the invention is built on a device which can be independent of the aerial/terrestrial antenna and protected (=without interferences) receiver; the system and method for aerial interferences cancellation from terrestrial sources may be installed in the device FPGA; besides the modules already mentioned, it comprises a communication module with different modules of the antenna control unit.

In other implementation of the invention, automated antenna terminal has an Antenna Control Unit (ACU) which is an integrated computer that can host the system for aerial interferences cancellation from terrestrial sources in its FPGA or in its operating system.

In other implementation of the invention, the protected receiver such as demodulator, router, modem, etc, that can host the system and method for aerial interferences cancellation from terrestrial sources of the present invention in its FPGA or canceller method in its operating system.

In other implementation of the invention, a protected cloud that can host the system and method for aerial interferences cancellation from terrestrial sources in its FPGA or in its operating system and the cancellation would be in IF in Vita49 or DIFI or any other form (digital format and will not require to digitalize the received signal in the aerial antenna as well as digitalizing the interference received in the terrestrial antenna).

In a second aspect of the invention, a moving object is disclosed. The moving object may be selected between one of the group consisting on ships, planes, UAVs, Drones and terrestrial vehicles, wherein the moving object comprises any embodiment of the system described under the first aspect of the invention.

To better illustrate and explain this description, following a set of diagrams representing the invention is shown, as an integrating part of this document, intended for illustrative, but not limiting, purposes.

DESCRIPTION OF THE INVENTION

The following is a description of several embodiments of the present patent disclosure based on the above mentioned figures.

Figure 1:
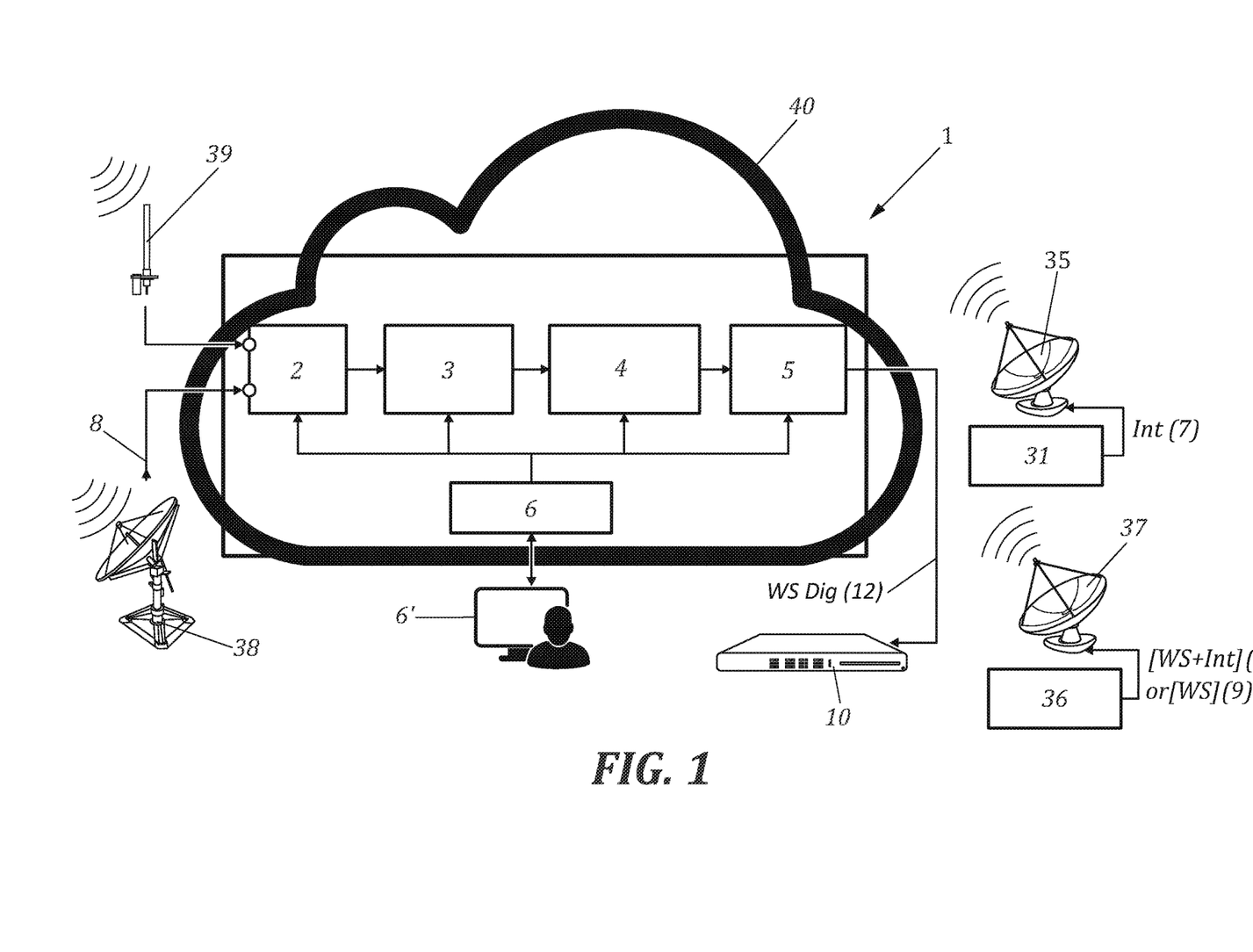
FIG. 1.—This figure shows a block diagram of the invention and, conceptually, how satellite signals are measured, interferences are detected and cancelled with or without an operator intervention.

In FIG. 1, a preferred embodiment of the present patent disclosure is shown, where the system is deployed as an independent device 1 between the aerial (satellite 38 or wireless 39) antenna and the protected receiver 10, with an Application Protocol Interface "API" 6 that the operator 6' can handle and configure. Before running the system 1 for the first time, the system 1 is initiated with default values or initial values provided by the operator 6' through the API 6. The receiver 10 is "protected" because it receives signals without interferences, which are cancelled with the present system. The system may be virtualized in the cloud 40 in the form of a firmware. The system comprises several modules in charge of receiving and processing the wanted signal with interference "WS+Int" 8. Thus, the system 1, as depicted in FIG. 1 for receiving the wanted signal with interference 8, comprises the satellite antenna 38, the Signal Reception module 2, the Interference Signal Detection and Estimation module 3, the Interference Canceller module 4, the Wanted Signal Generation 5 module, the API 6, the wireless antenna 39 and the protected receiver 10. The system 1, as depicted in FIG. 1 for transmitting the wanted signal with interference 8 or the analog wanted signal WS 9 along with the interference signal 7, comprises the jammer antenna 37 connected to the encryption module 36, and the encryption and inhibitor locator antenna 35 connected to the encryption and inhibitor locator module 31. The jammer antenna 37 and the encryption and inhibitor locator antenna 35 are placed separately.

Figure 2:
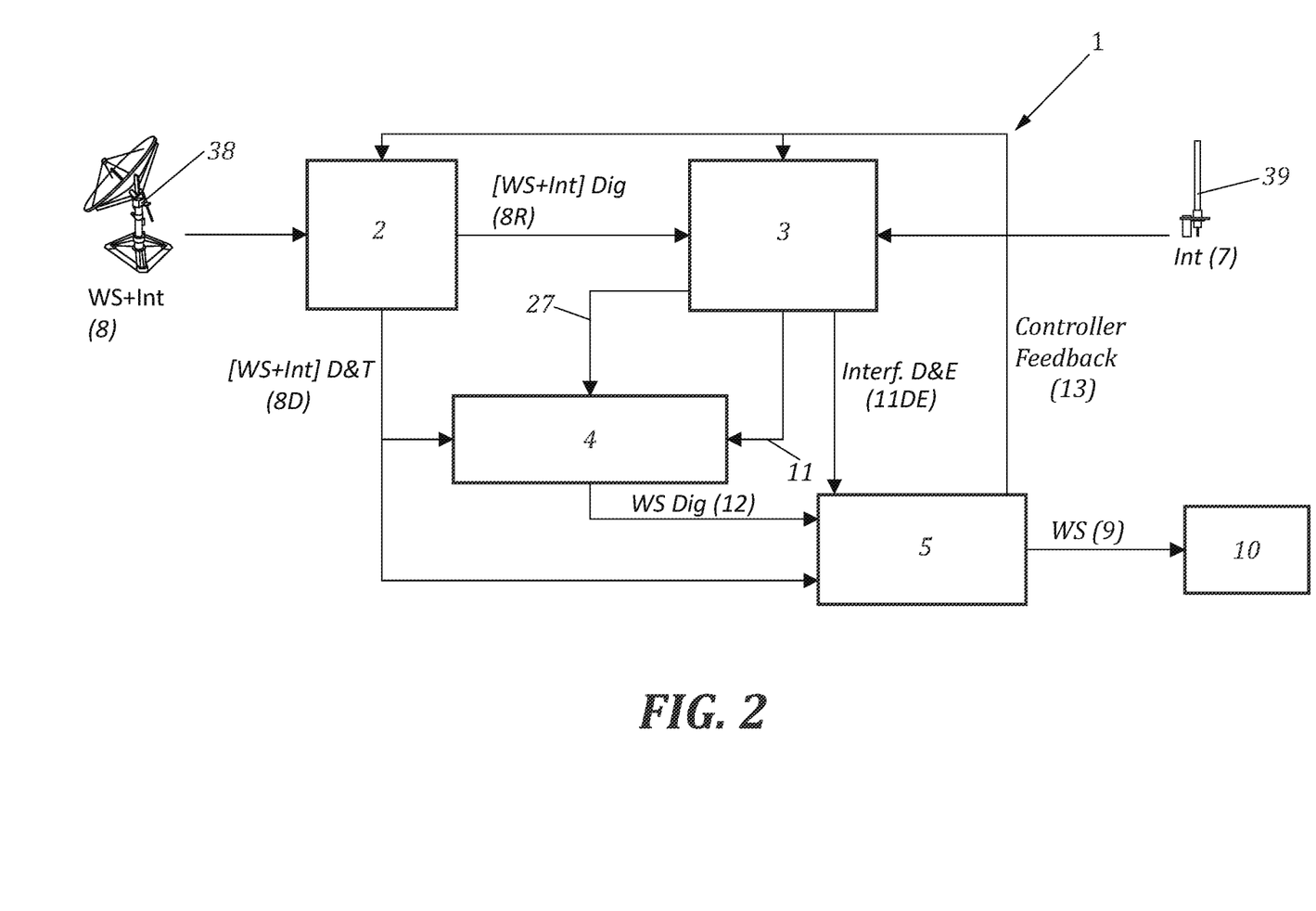
FIG. 2.—This figure shows a functional block of the main blocks comprised in the system.

In FIG. 2, the modules of the system 1 for receiving the analog wanted signal with interference "WS+Int" 8 and for getting the analog wanted signal "WS" 9, are shown. Specifically, the system 1 comprises the Signal Reception module 2, the Interference Signal Detection and Estimation module 3, the Interference Canceller module 4 and the Wanted Signal Generation module 5. The satellite antenna 38 is connected to the Signal Reception module 2. The analog wanted signal with interference "WS+Int" 8 is an analog signal captured by the satellite antenna 38 and transmitted to the Signal Reception module 2. The Signal Reception module 2 digitalizes the analog wanted signal with interference "WS+Int" 8 and provides the digital wanted signal with interference "[WS+Int] Dig" 8R to the Interference Signal Detection and Estimation module 3, and the tuned digital wanted signal with interference "[WS+Int] D&T" 8D to the Interference Canceller module 4 and to the Wanted Signal Generation module 5. The Interference Signal Detection and Estimation module 3 also receives the Interference signal "Int" 7 from the wireless antenna 39 if the antenna 39 is provided, or when it is provided, if there is the interference signal "Int" 7 received from the antenna 39. The Interference Signal Detection and Estimation module 3 computes the digital wanted signal with interference "[WS+Int] Dig" 8R signal, the analog Interference signal "Int" 7 (if any) and the digital Controller Feedback 13 signal (coming from the Wanted Signal Generation module 5), to generate the Estimated Errors 27 signal and the Reference signal 11, both to be sent to the Interference Canceller module 4, and to generate the Detected&Estimated Interference 11DE signal (Interf. D&E signal) to be sent to the Wanted Signal Generation module 5. The Interference Canceller module 4 performs a digital computation and provides the digital wanted signal "WS Dig" 12 to the Wanted Signal Generation module 5, which regenerates the wanted signal "WS" 9 in analog format as a final output of the system 1. The analog wanted signal "WS" 9 is finally sent to the protected receiver 10. Thus, the protected receiver 10 receives the same analog wanted signal with interference "WS+Int" 8 received at the satellite antenna 38 without the interference "Int" 7, i.e. the interference is cancelled.

Figure 3:
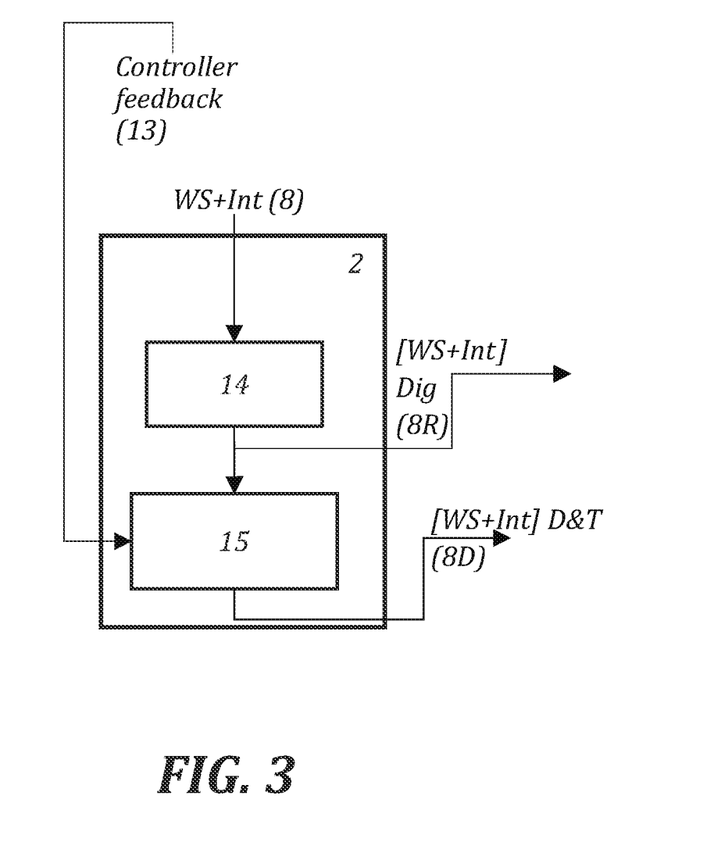
FIG. 3.—This figure shows a functional block diagram of the Signal Reception module.

In FIG. 3, the signal reception module 2 is shown. The signal reception module 2 has two inputs and two outputs. The inputs are provided to receive the digital Controller Feedback 13 signal and the analog wanted signal with interference "WS+Int" 8. The signal reception module 2 has the Radio Signal Digitalization sub-module 14 and the Hard Tuning sub-module 15. The Radio Signal Digitalization sub-module 14 digitalizes, by means of an Analog-to-Digital converter, the analog wanted signal with interference "WS+Int" 8 to generate the digital wanted signal with interference WS+Int 8R. Then, the Hard Tuning sub-module 15 processes the digital wanted signal with interference "[WS+Int] Dig" 8R based on the Controller Feedback 13 coming from the Controller sub-module 22 included in the Wanted Signal Generation module 5, and provides the tuned digital wanted signal with interference "[WS+Int] D&T" 8D as an output of the Signal Reception Module 2.

Figure 4:
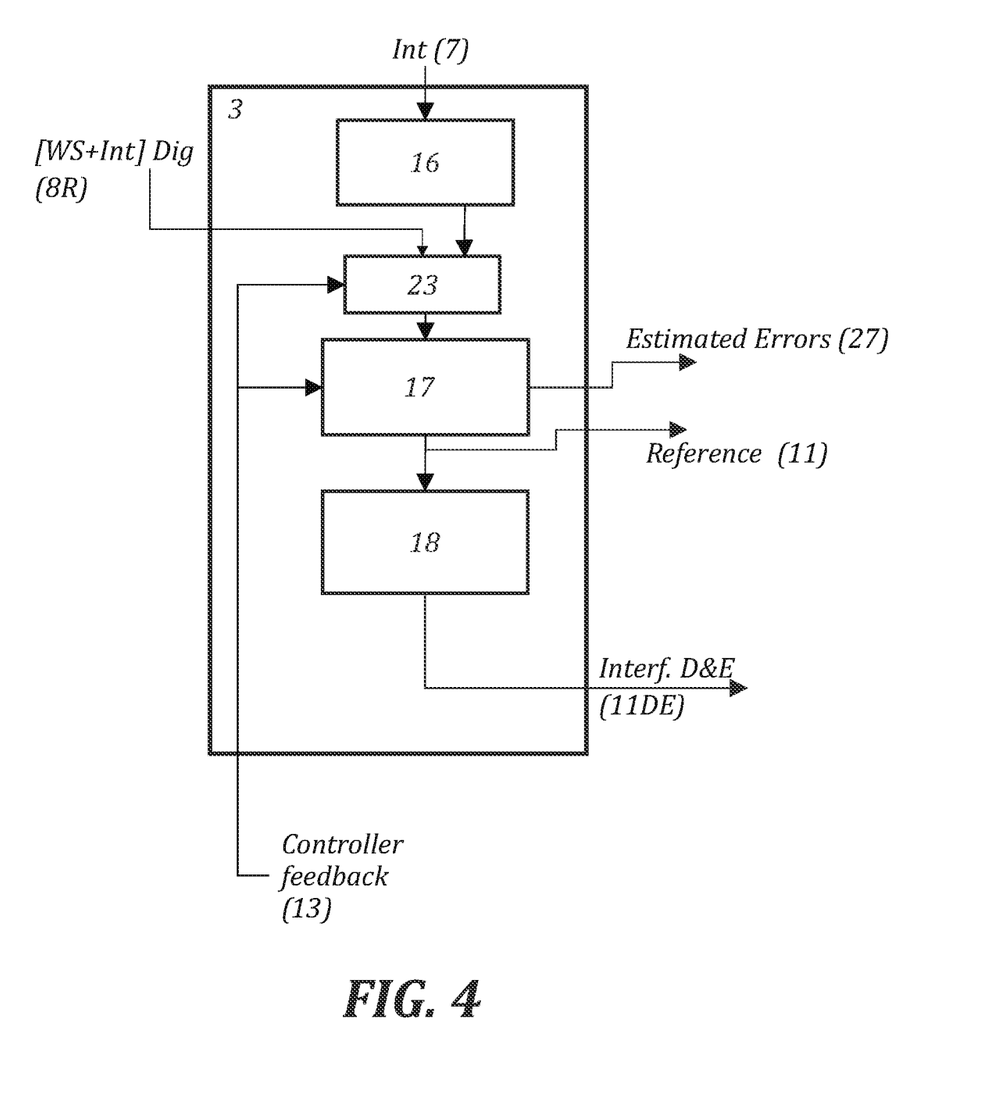
FIG. 4.—This figure shows a functional block diagram of the Interference Signal Detection and Estimation module.
Figure 5:
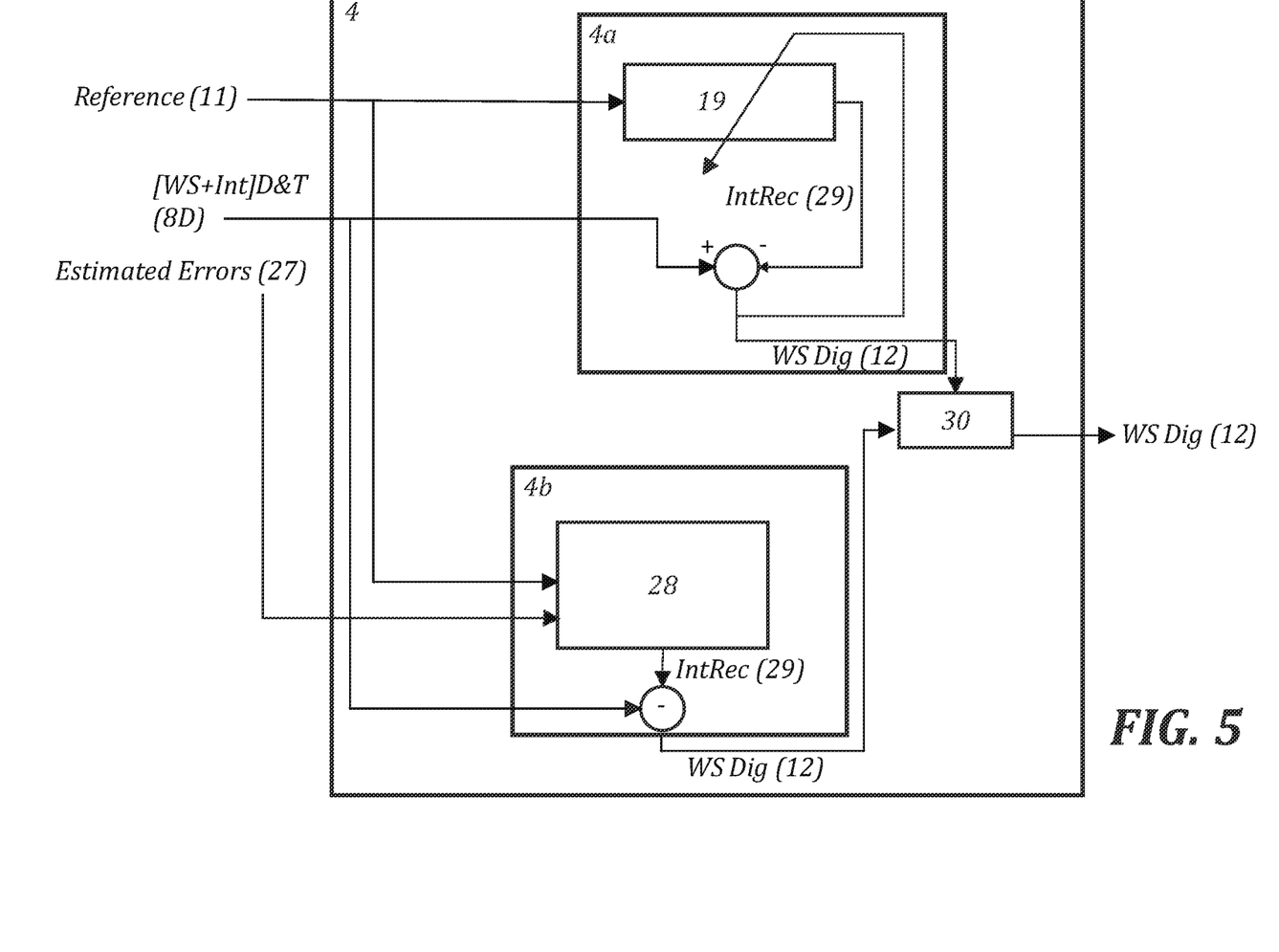
FIG. 5.—This figure shows a functional block diagram of the Interference Canceller module and its main sub-modules, the ANC Interference Canceller sub-module and the Hard Interference Canceller sub-module.

In FIG. 4, the Interference Signal Detection and Estimation module 3 is shown. The Interference Signal Detection and Estimation module 3 has three inputs and three outputs. The analog interference "Int" 7 signal received at the wireless antenna 39 is transferred to the Radio Digitalization sub-module 16, which applies an Analog-to-Digital conversion to the analog interference "Int" 7 signal to obtain the digital interference signal. Then, the selector 23 selects between the digital interference "Int" 7 signal coming from the Radio Digitalization sub-module 16 or the digital wanted signal with interference "[WS+Int] Dig" 8R depending if there is an interference coming from the wireless antenna 39 or not. The presence of any kind of interference at the wireless antenna 39 is included in the Controller Feedback 13 signal. Then, the Precise Tuning sub-module 17 calibrates the digital interference "Int" 7 for the optimal computation, taking into account the Controller Feedback 13 signal. The Precise Tuning sub-module 17 provides the Reference 11 signal which is the tuned signal optimized for the interference reception in digital format. The Precise Tuning sub-module 17 also provides the Estimated Errors 27 signal used as a feedback signal to be sent to the Reconstruction Errors sub-module 28 provided in the Hard Interference Canceller sub-module 4b (FIG. 5). Additionally, the Interference Detection and Estimation sub-module 18 characterize the value of the Reference signal 11 and generate the Interference Detection and Estimation signal 11DE to be sent to the Controller 22 of the Wanted Signal Generation 5. The Interference Detection and Estimation 11DE signal ("Interf. D&E" 11DE) could be a "yes or no" signal, where it could also provide the bandwidth, modulation, symbol rate, etc., if the "Interf. D&E" 11DE signal is yes.

In FIG. 5, the Interference Canceller module 4 and its main sub-modules, the ANC Interference Canceller sub-module 4a used when the wireless antenna 39 is present, and the Hard Interference Canceller sub-module 4b when the wireless antenna 39 is not present, are shown. The Interference Canceller module 4 has inputs for the Reference signal 11, the Estimated Errors signal 27 and the digitalized wanted signal with interference 8D. The ANC Interference Canceller sub-module 4a comprises the Adaptive filter 19, which computes the Reference signal 11, with the digitalized wanted signal with interference "[WS+Int] D&T" 8D to obtain the digital wanted signal "WS Dig" 12. The adaptive filter provides the Reconstructed Interference signal 29 which is the Reference signal 11 adjusted with the result of subtracting the Reconstructed Interference signal 29 from the digitalized wanted signal with interference "[WS+Int] D&T" 8D. The Hard Interference Canceller sub-module 4b comprises the Reconstruction Error sub-module 28 which computes the Reference signal 11 with the Estimated Errors signal 27 to obtain the digital wanted signal "WS Dig" 12 by the subtraction of the Reconstructed Interference "IntRec" 29 from the digitalized wanted signal with interference "[WS+Int] D&T" 8D. Additionally, the Output Selector 30 provided at the Interference Canceller module 4 is selecting the preferred digital wanted signal "WS Dig" 12 between the digital wanted signal "WS Dig" 12 from the ANC Interference Canceller sub-module 4a and the digital wanted signal "WS Dig" 12 from the Hard Interference Canceller sub-module 4b depending if there is the wireless antenna 39 connected or not, or if there is an interference coming from the wireless antenna 39 or not.

Figure 6:
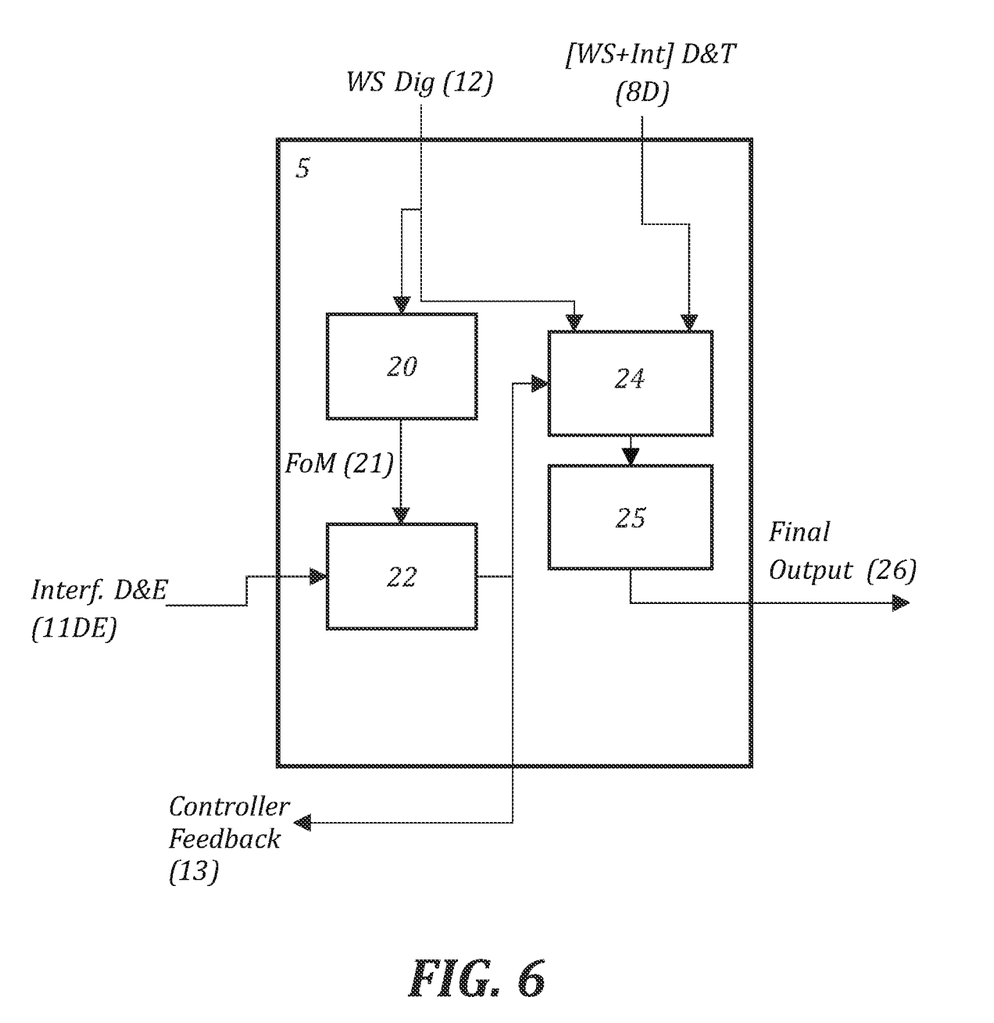
FIG. 6.—This figure shows a functional block diagram of the Wanted Signal Generation module.

In FIG. 6, the Wanted Signal Generation module 5 is shown. The Wanted Signal Generation module 5 comprises the Receptor 20, the Controller 22, the Switcher 24 and the Signal Generator 25. The Wanted Signal Generation module 5 has an input for the digital wanted signal "WS Dig" 12 which is sent to the Receptor 20 and to the Switcher 24. The Wanted Signal Generation module 5 has another input for the digitalized wanted and tuned signal with interference "[WS+Int] D&T" 8D coming from the signal reception module 2. The receptor 20 analyzes the digital wanted signal "WS Dig" 12 and provides the Figure of Merit "FoM" 21 information based on time and phase to the Controller 22. The Controller 22 includes the "cancellation limits", which includes signal and modulation parameters like power signal, type and phase-shift modulation, and symbol rate, that allow signal encryption to be optionally carried out by the encryption and inhibitor locator module 31 and/or the encryption module 36. The Controller 22 also receives the "Interf. D&E" 11DE signal from the Interference Signal Detection and Estimation module 3. Based on both two inputs, the Controller 22 provides the Controller Feedback signal 13 as an output of the Wanted Signal Generation module 5 and also as an input for the Switcher 24 to guide it to select between the digital wanted signal "WS Dig" 12 or the digitalized wanted and tuned signal with interference "[WS+Int]D&T" 8D by comparing both and selecting the best of the two signals, being the best signal that signal with better FoM between both input signals. Then, the Switcher 24 provides the selected output, and the Signal Generator 25 converts the selected digital signal into an analog signal as the Final Output 26 of the system 1 so that the protected receiver 10 benefits from the cancellation process in case of an interference is added to the wanted signal.

Figure 7:
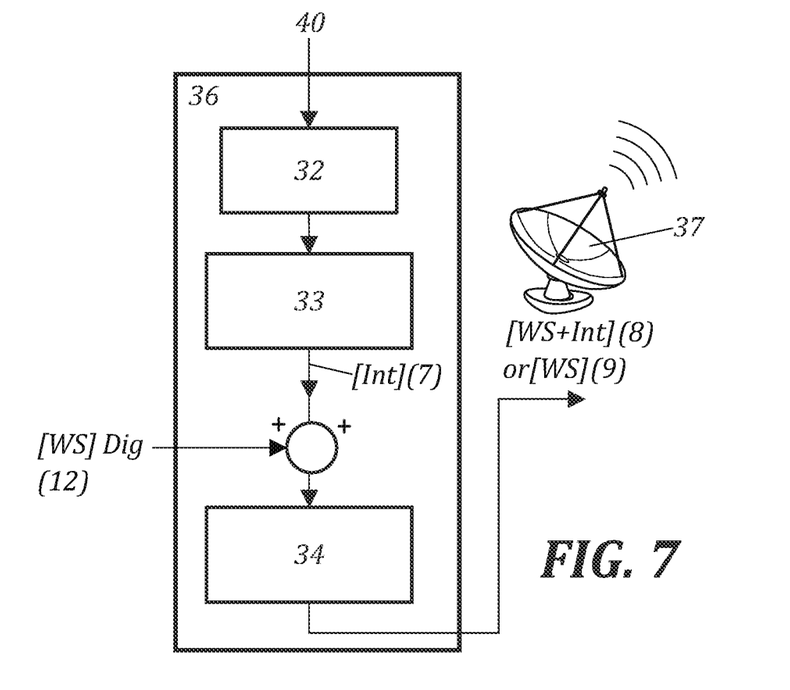
FIG. 7.—This figure shows a functional block diagram of the Encryption module.
Figure 8:
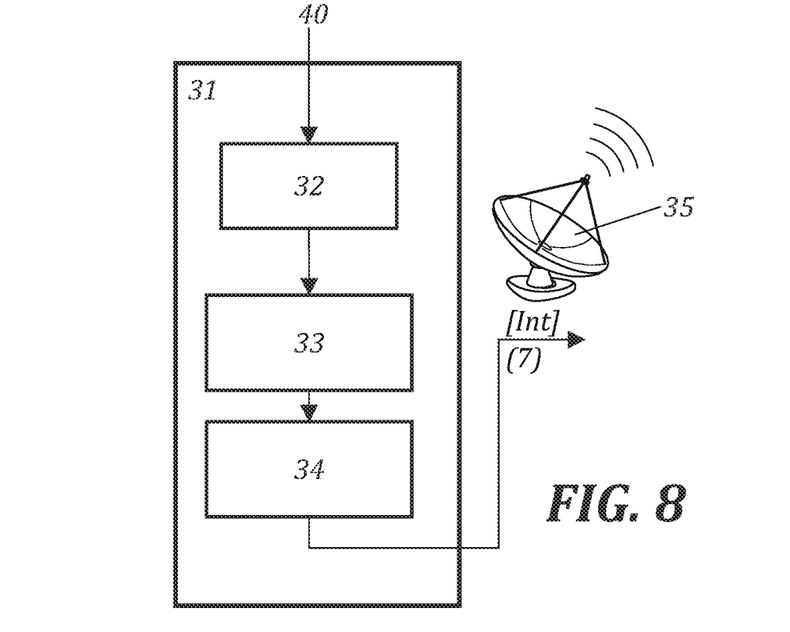
FIG. 8.—This figure shows a functional block diagram of the Encryption and Inhibitor Locator module.
Figure 9:
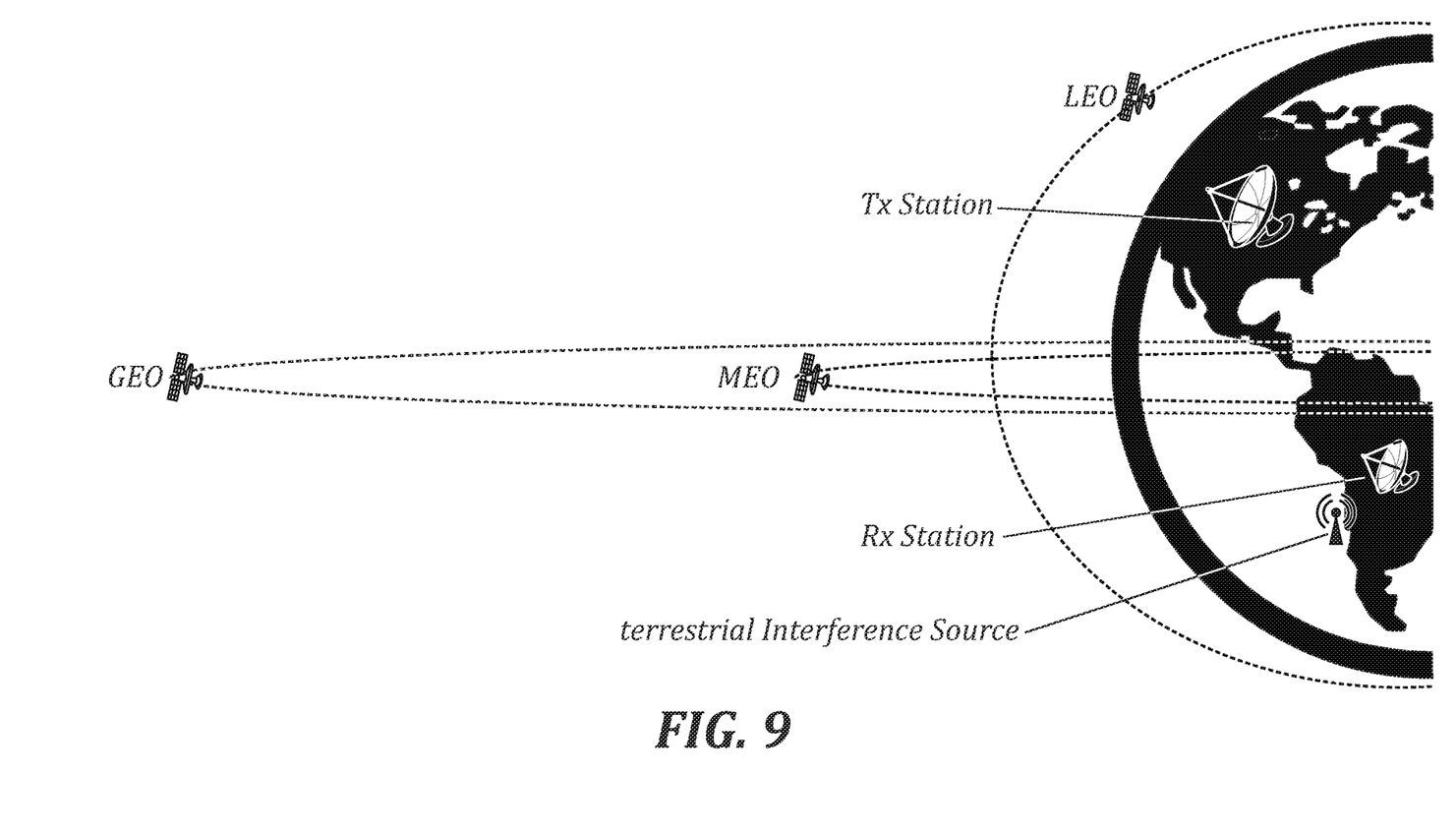
FIG. 9.—This figure shows a diagram of the communications from the hub server in the LEO, MEO or GEO scenario, applicable to all type of payloads and frequency ranges.

The system 1 may further comprise not only signal reception but also encrypted signal transmission. To carry out the encrypted signal transmission, the system may further comprise the encryption module 36, the encryption and inhibitor locator module 31 or the encryption and inhibitor locator module 31 along with the encryption module 36. The encryption module 36 is able to transmit an encrypted signal with interference in analog format in such a way that the protected receiver 10 is able to decrypt, since the same cancellation limits (signal and modulation parameters) are provided in the protected receiver 10, in the encryption and inhibitor locator module 31 and in the encryption module 36. If the encryption module 36 is combined with the encryption and inhibitor locator module 31, the location of the protected receiver 10, the encryption module 36 and the encryption and inhibitor locator module 31 is prevented. To this end, the reception antennas 38 and 39 connected to the protected receiver 10, the transmission antenna 35 connected to encryption and inhibitor locator module 31 and the transmission antenna 37 connected the encryption module 36 should be placed separately.

In FIG. 7, an example of the optional encryption module 36 is shown. The encryption module 36 comprises two inputs, one for the digital wanted signal "[WS] Dig" 12 and another one for the Encryption On/Off signal 40, and an output for the analog wanted signal with interference 8. The optional encryption module 36 is able to provide the analog wanted signal "WS" 9, or the analog wanted signal with interference "[WS+Int]" 8. The interference of the analog wanted signal with interference "[WS+Int]" 8 is encrypted since the interference is generated by the encryption module 36 and it is known for the Wanted Signal Generation module 5, since both (5, 36) share the same signal and modulation parameters. The encryption module 36 comprises the jammer signal parameters sub-module 32, the Limit Controller sub-module 33 and the Signal Generation sub-module 34. The encryption module 36 receives the Encryption On/Off signal 40 to enable or disable encryption by a user. In case of encryption, the jammer signal parameters sub-module 32 sets the jammer signal parameters by default. Then, the Limit Controller sub-module 33 compares the "cancellation limits" (the same signal and modulation parameters as those comprised in the Controller 22 of the Wanted Signal Generation module 5) with the jammer signal parameters, which are adjusted in case the jammer signal parameters exceed the cancellation limits after being coded. The Limit Controller sub-module 33 (depicted in FIG. 7 as a separated device for clarity purposes) generates the digital interference signal 7 based on the jammer signal parameters. Then, if the encryption module 36 receives the order to disable encryption, no signal is provided the digital wanted signal "[WS] Dig" 12 is provided to the signal generator 34, which converts it to the analog wanted signal "WS" 9. On the contrary, if the encryption module 36 receives the order to enable encryption (Encryption On/Off signal 40=On), the signal generator 34 computes the digital wanted signal "[WS] Dig" 12 with the digital interference signal "Int" 7 to generate the analog "encrypted" signal "[WS+Int]" 8, Then, the analog wanted signal with interference "[WS+Int]" 8 is sent to the jammer antenna 37, in which the interference "Int" 7 acts as encryption. The wanted signal with (known) interference 8 is transmitted over the air, with a satellite or terrestrial antenna.

In FIG. 8, an example of the encryption and inhibitor locator module 31 is shown. The encryption and inhibitor locator module 31 comprises an input for the Encryption On/Off signal 40 and an output for the analog interference signal 7, which acts as encryption and inhibitor signal. The encryption and inhibitor locator module 31 comprises the jammer signal parameters sub-module 32, the Limit Controller sub-module 33 and the Signal Generation sub-module 34. The encryption and inhibitor locator module 31 receives the Encryption On/Off signal 40 to enable or disable encryption by the user. In case of encryption, the jammer signal parameters sub-module 32 sets the jammer signal parameters by default. Then, the Limit Controller sub-module 33 compares the "cancellation limits" (the same as those comprised in the Controller 22 of the Wanted Signal Generation module 5) with the jammer signal parameters, which are adjusted in case the jammer signal parameters exceeds the cancellation limits after being hard coded. The Limit Controller sub-module 33 generates the digital interference signal "Int" 7 based on the jammer signal parameters. Then, if the encryption module 36 receives the order to enable encryption, the signal generator 34 outputs the analog interference signal 7 to the encryption and inhibitor locator antenna 35 (in a different location than the wanted signal antenna 37). The analog interference signal 7 is an analog signal transmitted over the air, with a satellite or terrestrial antenna. The analog interference signal 7 having the form of a signal that the Controller 22 of the Wanted Signal Generation module 5 is able to decrypt as previously described.

By combining both signals (wanted signal "WS" 9 from antenna 37 and analog interference signal "Int" 7 from antenna 35) received from different locations, there is no method of TDOA or FDOA (traditional geolocation technique) to be applied, so the wanted signal "WS" 9+interference signal "Int" 7 will not be able to be geolocalized, adding a novelty protection.

The invention claimed is:

1. A system for Aerial Interferences Cancellation and RF Encryption and Geolocation inhibition, comprising a Signal Reception module, an Interference Signal Detection and Estimation module, an Interference Canceller module and a Wanted Signal Generation module, wherein:

the signal reception module is configured to receive an analog wanted signal with interference from an aerial antenna, to generate a digitalized wanted signal with interference and to generate a tuned and digitalized wanted signal with interference;

the Interference Signal Detection and Estimation module is configured to receive the tuned digitalized wanted signal with interference, to receive a digital Controller Feedback signal, and also configured to generate an Estimated Errors signal, a Reference signal and a Detected & Estimated Interference signal;

the Interference Canceller module is configured to receive the digitalized wanted signal with interference, the Estimated Errors signal, the Reference signal, and also configured to generate a digital wanted signal; and the Wanted Signal Generation module is configured to receive the digitalized wanted signal with interference, the digitalized wanted signal, the Detected & Estimated Interference signal, and to convert the digitalized wanted signal into an analog wanted signal.

2. The system of claim 1, wherein the Interference Signal Detection and Estimation module is configured to receive an analog interference signal from a wireless antenna.

3. The system of claim 1, wherein the signal reception module comprises a Radio Signal Digitalization sub-module and a Hard Tuning sub-module, so that the Radio Signal Digitalization sub-module digitalizes, by means of an Analog-to-Digital converter, an analog wanted signal with interference to generate a digital wanted signal with interference; wherein the Hard Tuning sub-module is configured to tune the digital wanted signal with interference based on the Controller Feedback signal coming from the Wanted Signal Generation module, and provides the tuned digital wanted signal with interference.

4. The system of claim 1, wherein the Interference Signal Detection and Estimation module comprises a Precise Tuning sub-module and an Interference Detection and Estimation sub-module; wherein:
the Precise Tuning sub-module comprises an input for the digitalized wanted signal with interference and an input for the Controller Feedback signal; the Precise Tuning sub-module is configured to provide the Reference signal which is the tuned signal optimized for the interference reception in digital format; the Precise Tuning sub-module also provides the Estimated Errors signal; and
the Interference Detection and Estimation sub-module is configured to characterize the value of the Reference signal and also to generate the Interference Detection and Estimation signal to be sent to the Controller of the Wanted Signal Generation.

5. The system of claim 2, wherein the Interference Signal Detection and Estimation module comprises a Radio Digitalization sub-module, a Selector sub-module, a Precise Tuning sub-module and a Interference Detection and Estimation sub-module; wherein:
the Radio Digitalization sub-module comprises an input for the analog interference signal, and the Radio Digitalization sub-module is configured to digitalize the analog interference signal;
the selector is configured to select between the digitalized interference signal coming from the Radio Digitalization sub-module or the digitalized wanted signal with interference based on the Controller Feedback signal;
the Precise Tuning sub-module provides the Reference signal which is the tuned signal optimized for the interference reception in digital format; the Precise Tuning sub-module also provides the Estimated Errors signal; and
the Interference Detection and Estimation sub-module is configured to characterize the value of the Reference signal and also to generate the Interference Detection and Estimation signal to be sent to the Controller of the Wanted Signal Generation.

6. The system of claim 5, wherein the Interference Canceller module comprises an ANC Interference Canceller sub-module, which in turn comprises inputs for the Reference signal and for the digitalized wanted signal with interference, wherein the ANC Interference Canceller sub-module comprises an adaptive filter, which is configured to compute the Reference signal, with the digitalized wanted signal with interference to obtain the digital wanted signal.

7. The system of claim 4, wherein the Interference Canceller module comprises a Hard Interference Canceller sub-module, which in turn comprises inputs for the Reference signal, for the digitalized wanted signal with interference and for the Estimated Errors signal, wherein the Hard Interference Canceller sub-module comprises a Reconstruction Error sub-module, which is configured to compute the Reference signal, the digitalized wanted signal with interference and the Estimated Errors signal to obtain the digital wanted signal.

8. The system of claim 4, wherein the Wanted Signal Generation module comprises a Receptor, a Controller comprising signal and modulation parameters, a Switcher and the Signal Generator; the Wanted Signal Generation module comprises inputs for the digital wanted signal, which is sent to the Receptor and the Switcher, for the Interference Detection and Estimation signal and for the digitalized wanted signal with interference; wherein:
the receptor is configured to analyze the digital wanted signal and to provide a Figure of Merit "FoM" information based on time and phase to the Controller;
the Controller is configured to provide the Controller Feedback signal and guides the Switcher to select between the digital wanted signal or the digital wanted signal with interference by comparing the Figure of Merit "FoM" of both of them;
the Switcher is configured to provide the selected output;
the Signal Generator is configured to convert the selected digital signal into an analog signal.

9. The system of claim 8, wherein the system further comprises an encryption module configured to encrypt the digital wanted signal, wherein the encryption module comprises a jammer signal parameters sub-module, a Limit Controller sub-module and a Signal Generation sub-module; wherein:
the jammer signal parameters sub-module is configured to set jammer signal parameters by default;
the Limit Controller sub-module compares the signal and modulation parameters with the jammer signal parameters, which are adjusted in case the jammer signal parameters exceeds the signal and modulation parameters after being coded;
the Limit Controller sub-module is configured to generate a digital interference signal based on the jammer signal parameters and to add the digital interference signal with the digital wanted signal; and
the signal generator is configured to convert the digital wanted signal with interference into an analog wanted signal with interference and to output it to a jammer antenna.

10. The system of claim 8, wherein the system further comprises an encryption and inhibitor locator module, which in turn comprises an input for an Encryption On/Off signal and an output for an analog interference signal, wherein the encryption and inhibitor locator module further comprises a jammer signal parameters sub-module, a Limit Controller sub-module and a Signal Generation sub-module; wherein:
the jammer signal parameters sub-module is configured to set jammer signal parameters by default;
the Limit Controller sub-module is configured to generate a digital interference signal based on the jammer signal parameters;
the signal generator is configured to convert the digital interference signal into an analog interference signal and to output it to an encryption and inhibitor locator antenna.

11. The system of claim 9, wherein the system further comprises the jammer antenna connected to the encryption module, and the encryption and inhibitor locator antenna connected to the encryption and inhibitor locator module, wherein the jammer antenna and the encryption and inhibitor locator antenna are placed separately.

12. The system of claim 2, wherein the system is virtually deployed in a cloud and wherein it further comprises the aerial antenna configured to receive the analog wanted signal with interference; and the wireless antenna configured to receive an analog interference signal.

13. The system of claim 1, wherein the analog interference signal is selected between the group consisting of 5G over C band, L, C, S, X, Ku, Ka, Q, V, terrestrial links and satellite links.

14. The system of claim 1, wherein the analog interference signal is transmitted over terrestrial networks such as jamming or accidental interferences between terrestrial links and terrestrial links.

15. The system of claim 1, wherein the analog interference signal is transmitted over terrestrial networks such as jamming or accidental interferences between satellite links and satellite links.

16. The system of claim 1, wherein the system is embedded in a external device, a firmware or a software.

17. The system of claim 1, wherein the system is able to cancel interferences over any satellite orbits, GEO, MEO, LEO, GPS, MCODE, GNSS, and wireless communications.

18. A moving object selected between one of the group consisting on ships, planes, UAVs, Drones and terrestrial vehicles, wherein the moving object comprises the system of claim 1.

* * * * *